Oct. 5, 1926.
P. H. R. LEROUX
1,601,864
APPARATUS FOR THE PROJECTION OF MICROSCOPIC IMAGES
Filed Dec. 4, 1923
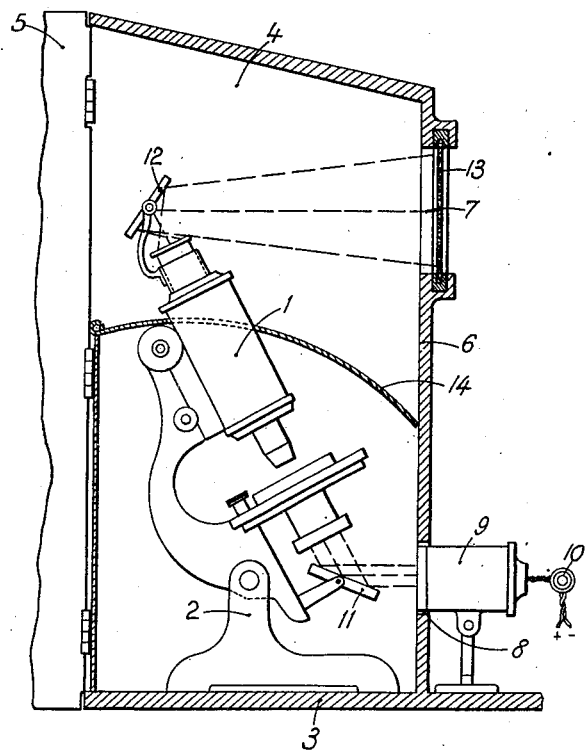
Inventor
P. H. R. Leroux
By Marko v Clerk
Attys.

Patented Oct. 5, 1926.

1,601,864

UNITED STATES PATENT OFFICE.

PAUL HENRI ROGER LEROUX, OF PARIS, FRANCE.

APPARATUS FOR THE PROJECTION OF MICROSCOPIC IMAGES.

Application filed December 4, 1923, Serial No. 678,504, and in France December 21, 1922.

The present invention has for its object the provision of an apparatus which permits of rendering visible to several persons the projections obtained from a microscopic image and of photographing these projections.

The apparatus comprises the combination of a microscope provided with suitable reflecting mirrors or prisms and a source of light together with a supporting casing the walls of which carry projection screens or photographic mounts, the said casing being provided with suitably disposed screens or partitions which divide the supporting casing into two compartments so that the rays from the luminous source do not interfere with the reflected rays.

The invention further relates to certain particular arrangements which are hereinafter described.

The accompanying drawing represents a casing intended for the projection of microscopic images in accordance with the invention.

If reference be made to the drawing, it will be seen that the microscope which may be of any suitable type is indicated at 1, the said microscope being supported by a base piece 2 which rests on the bottom 3 of the casing or box 4 which is provided with one or more than one door 5. The front wall 6 of the box is provided with two openings 7, 8. The bottom 3 is extended behind the wall 6 of the box so as to carry a source of light disposed in front of the opening 8. The luminous source employed is preferably an electric lamp combined with a resistance 10 which permits of varying the luminous tendency of the projection lamp. The microscope 1 is provided as usual with a lower orientable mirror 11 intended to illuminate the object, the upper part of the apparatus carrying also an orientable mirror intended to reflect the luminous rays coming from the object onto the opening 7 which can be provided with a screen 13. In connection with the foregoing it is to be noted that the mirrors are positioned in substantial alignment with the openings 7 and 8 so as to ensure of the proper reflection and projection of the light rays. One or more than one screen 14 is disposed in the box 4 with the necessary openings for the passage of the microscope and in such manner as to divide the box into two compartments, a lower compartment which receives the luminous rays from the source of light 9, the upper compartment being protected against direct lighting by the rays from the luminous source passing through screen 14 so as to avoid the interference with the projection.

By reason of this mounting an apparatus is obtained which comprises a microscope, adjustable mirrors on the upper and lower ends thereof, a source of light and a screen which permits of rendering visible to several persons the projections from a microscope.

This apparatus could be advantageously used for scientific projections such as in research work, in lecturing or for fixing on a photographic plate an enlargement of a microscopical examination.

The apparatus could also be employed for the projection and the microphotography of opaque bodies.

Having thus fully described the invention what is claimed as new and desired to be secured by Letters Patent is:—

A magnifying and projecting apparatus comprising a supporting casing, a transverse partition therein dividing the casing into an upper dark chamber and a lower light chamber and provided with an opening, a microscope mounted in the light chamber and projecting through the opening in the partition into the dark chamber, one wall of the casing provided with upper and lower openings, a source of light arranged in the lower opening for projecting rays into the light chamber, a screen mounted in the upper opening, and mirrors adjustably mounted on the upper and lower ends of the microscope and positioned respectively in forward alignment with the upper and lower openings for projecting light rays from the source of light through the microscope and for projecting the rays received from the microscope upon the screen.

In testimony whereof I hereunto affix my signature.

PAUL HENRI ROGER LEROUX.